Figure 1:
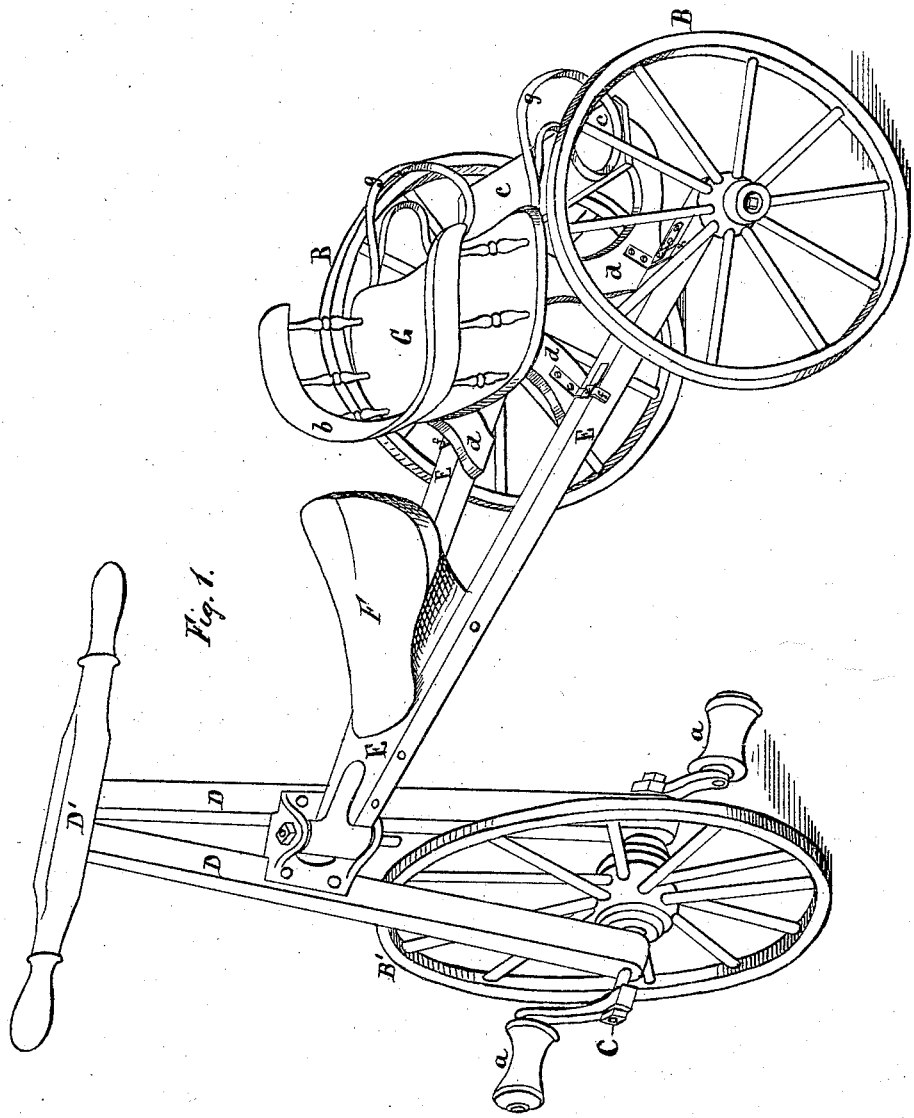

J. E. HOFFMIRE.
Velocipedes.

No. 134,989.

2 Sheets--Sheet 1.

Patented Jan. 21, 1873.

WITNESSES:
U.H. Weightman
Timothy Kane

INVENTOR.
John E. Hoffmire
by M. M. Zimpsim
his Attorney

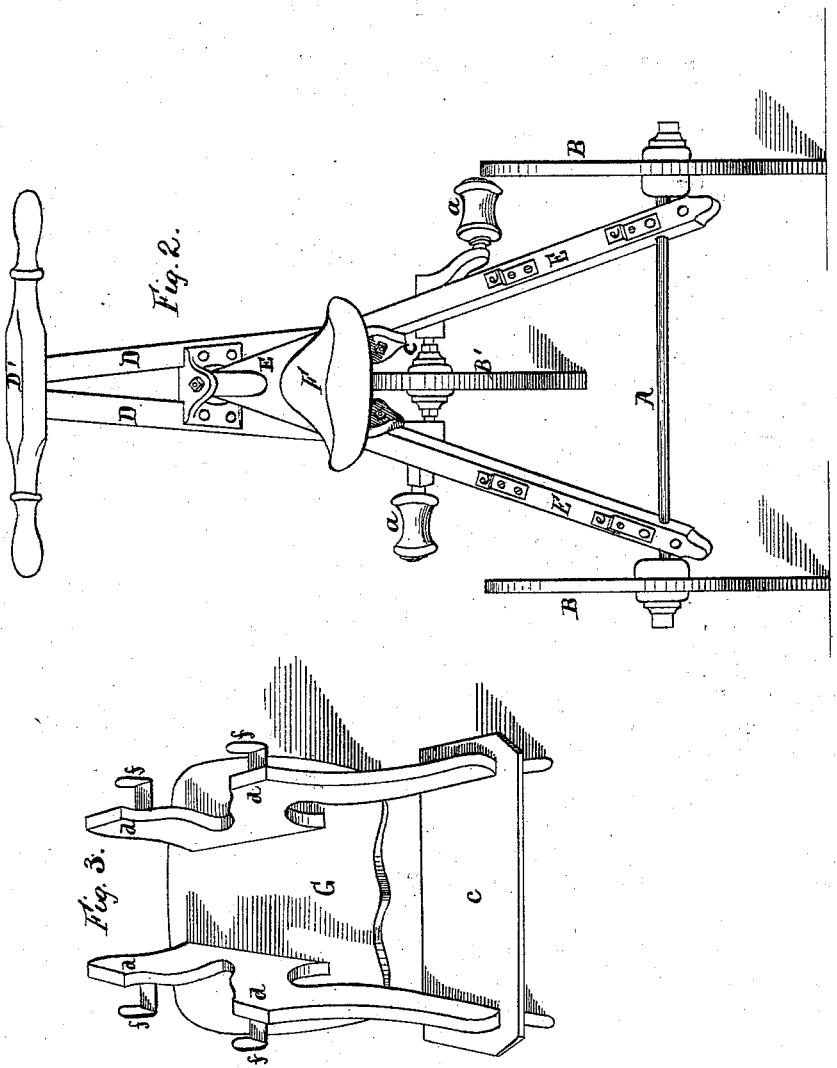

UNITED STATES PATENT OFFICE.

JOHN E. HOFFMIRE, OF NEW BRUNSWICK, NEW JERSEY.

IMPROVEMENT IN VELOCIPEDES.

Specification forming part of Letters Patent No. 134,989, dated January 21, 1873.

*To all whom it may concern:*

Be it known that I, JOHN E. HOFFMIRE, of New Brunswick, in the county of Middlesex and State of New Jersey, have invented a new and useful Improvement in Velocipedes; and I hereby declare that the following is a full, clear, and exact description of the same, reference being had to the accompanying drawing which forms part of this specification.

The present invention particularly relates to that style of boys' velocipedes which has a rear axle provided with a wheel at each end, a front axle provided with one wheel, and with crank-pins for pedal propulsion, a vertical forked steering-bar, which straddles the front wheel, and to which is hinged the forward end of a reach, which consists of two uprights, or is bifurcated and runs in a straight line, but in an angular direction, to the rear axle, where its two legs are secured near the hubs of the respective wheels, and which reach is provided with a saddle to form a seat for the boy who operates and rides the velocipede. This is a style of velocipede well known in the market, and which has an extensive sale on account of its durability, safety, and simplicity. In this style of velocipede there is a good deal of hitherto unoccupied and hence wasted space on this angular reach between the saddle and the rear axle, it being necessary to have this length of reach in order to place the front wheel and the rear wheels at a sufficient distance apart to reduce the liability of the velocipede tipping over. My invention has for its object the utilizing of this unoccupied space. My invention therefore consists in the arrangement, in a velocipede of the construction substantially as above specified, of a seat upon the angular reach, said seat facing the rear of the velocipede, and connected so as to be either stationary or removable, as will be presently more fully explained.

In the accompanying drawing, Figure 1 is perspective view of a velocipede of the construction referred to and provided with my improvement; Fig. 2 is a rear view of the same velocipede, the supplemental seat having been removed; and Fig. 3 is an inverted plan view of the said seat detached from the velocipede.

A designates the rear axle, which is provided with a wheel, B, at each end; and C designates the front axle, to which is secured a wheel, B', and which axle is also provided with crank-pins, *a a*, for the feet of the rider to rest upon to enable him to propel the velocipede. D is the steering-bar. This steering-bar consists, in the present instance, of two uprights, one on each side of the front wheel C, and provided at their upper ends with a cross-bar, D', upon which the hands of the rider are placed while propelling the velocipede, and which enables him to steer the same. E is the reach, the forward end of which is hinged to the steering-bar D, as will be clearly understood by reference to Fig. 1 of the drawing. This reach is bifurcated or has two legs, which latter are secured to the rear axle A, one near the hub of each wheel B. It will be noticed that this reach proceeds in a straight and direct line, but in an angular direction, from the steering-bar D to the rear axle A, and it is provided with a saddle, F, near its forward end for the occupancy of the rider; and by reference to Fig. 2 it will be further noticed that there is a long unoccupied space on said reach rearward of the saddle F. The length of reach which gives this unoccupied space is necessary, for if the device were more contracted as to length—that is, the hind wheels nearer the front wheels—the device would be impracticable, for the reason that it would be unmanageable and constantly tipping over.

My invention utilizes the waste space before referred to in a most desirable manner, as I will proceed to show.

G designates a seat, which is, preferably, provided with a back, *b*, and foot-rest *c*, and wheel-guards *g*. For the purpose of an easy attachment of this seat to the reach E I preferably provide it with side pieces *d d d d*, which are affixed to the seat at an angle corresponding to the angle formed by the two legs of the reach at such distance apart as to permit of their lying between and close up against the inside faces of the two legs of the reach when adjusted in proper place, as will be understood by reference to Figs. 1 and 3. This method of attachment is strong and durable, and in cases where the seat is to be a permanent fixture on the velocipede these side pieces may be screwed fast to the legs of the reach, or bolts with thumb-screws may be passed through the reach and side pieces, and when thus arranged the seat can be removed by simply unscrewing the thumb-nuts and withdrawing the bolts; but I have shown what appears to me to be a simple and quick means of attachment and detachment. For instance, I secure to the upper side of each leg of the reach two cleats $e\ e$, (see Figs. 2 and 3;) and to each side piece $d$ I secure two catches, $f$, so that on inserting the said side pieces between the legs of the reach just above the catches and sliding the seat down the catches and cleats will engage with each other and securely hold the seat in place. To remove the seat, a slight upward push of the seat with the hand will disengage the catches and cleats, when the seat can be quickly removed.

I have described the above as a desirable way in which to attach the seat to the reach; but I do not confine myself thereto, as there are many obvious ways of properly securing the seat in place. This seat G, it will be observed, is so arranged on the reach as to face rearward, and hence access to it is rendered very easy.

I am well aware that it is not new to provide velocipedes with two seats. There are several patents showing the same, particularly that numbered 86,856, February 9, 1869; but in this, as in other cases, the arrangement of the rear seat is not the same as the arrangement of my supplemental seat; nor, indeed, is the construction of the velocipedes the same as that I have illustrated, and to which I confine my invention.

What I claim as new, and desire to secure by Letters Patent, is—

In a velocipede of the construction substantially as herein shown and described, the combination and arrangement upon the inclined bifurcated reach E E of the seat G facing rearward, the latter provided with the side pieces $d\ d$ for adapting it to the bifurcated reach, substantially as herein shown and described.

JOHN E. HOFFMIRE.

Witnesses:
A. D. CORNWELL,
JOSEPH G. FIELD.